US010530525B1

(12) United States Patent
Chen et al.

(10) Patent No.: US 10,530,525 B1
(45) Date of Patent: Jan. 7, 2020

(54) METHOD AND APPARATUS FOR DEMODULATING SIGNAL

(71) Applicant: DATANG MOBILE COMMUNICATIONS EQUIPMENT CO., LTD, Beijing (CN)

(72) Inventors: Yuetan Chen, Beijing (CN); Ling Wang, Beijing (CN); Lihua Ni, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 0 days.

(21) Appl. No.: 16/474,570

(22) PCT Filed: Aug. 31, 2017

(86) PCT No.: PCT/CN2017/099938
§ 371 (c)(1),
(2) Date: Jun. 28, 2019

(87) PCT Pub. No.: WO2018/120896
PCT Pub. Date: Jul. 5, 2018

(30) Foreign Application Priority Data

Dec. 29, 2016 (CN) .......................... 2016 1 1248829

(51) Int. Cl.
*H04L 1/00* (2006.01)
*H04L 27/22* (2006.01)
*H04L 27/26* (2006.01)

(52) U.S. Cl.
CPC ............ *H04L 1/0054* (2013.01); *H04L 27/22* (2013.01); *H04L 27/2649* (2013.01)

(58) Field of Classification Search
CPC .... H04L 1/0054; H04L 27/22; H04L 27/2649
See application file for complete search history.

(56) References Cited

U.S. PATENT DOCUMENTS

2005/0180760 A1\* 8/2005 Feced ................ H04B 10/2575
398/183

FOREIGN PATENT DOCUMENTS

CN 101626357 A 1/2010
CN 101854226 A 10/2010
(Continued)

Primary Examiner — Nguyen T Vo
(74) Attorney, Agent, or Firm — Kilpatrick Townsend & Stockton, LLP

(57) ABSTRACT

Disclosed are a method and apparatus for demodulating a signal. The method comprises: obtaining a received signal, wherein the received signal comprises a phase noise signal; establishing a likelihood probability ratio integral model on the basis of the received signal and a preset phase noise parameter, wherein the phase noise parameter represents the phase noise signal and is a random variable; performing phase rotation angle extraction and transformation processing and discretization processing on the likelihood probability ratio integral model to obtain a likelihood probability ratio discrete model, wherein the phase rotation angle represents the phase rotation angle obtained on the basis of the phase noise signal; and determining a likelihood probability ratio corresponding to the received signal on the basis of the likelihood probability ratio discrete model to obtain a demodulation result. In this way, a base station overcomes phase noise, and improves signal receiving performance, signal demodulation efficiency and signal demodulation accuracy by performing phase compensation and discrete calculation on a received signal to obtain the demodulation result.

12 Claims, 3 Drawing Sheets

(56) References Cited

FOREIGN PATENT DOCUMENTS

| | | | |
|---|---|---|---|
| CN | 103378921 | A | 10/2013 |
| CN | 104871465 | A | 8/2015 |
| WO | 2016035895 | A1 | 3/2016 |

* cited by examiner

METHOD AND APPARATUS FOR DEMODULATING SIGNAL

This application is a US National Stage of International Application No. PCT/CN2017/099938, filed Aug. 31, 2017, which claims priority to Chinese Patent Application No. 201611248829.9, filed with the Chinese Patent Office on Dec. 29, 2016, and entitled "Method and apparatus for demodulating signal", which is hereby incorporated by reference in its entirety.

FIELD

The present invention relates to the field of communications, and particularly to a method and apparatus for demodulating a signal.

BACKGROUND

In a Long Term Evolution (LTE) system, phase noise independent of Gaussian white noise may occur during a transmission signal of a User Equipment (UE) or an evolved Node B (eNB) is being processed. The phase noise refers to such a random change in phase of a signal output by the system (such as various radio frequency devices) that arises from various noises in the system.

Since there is a random change in phase of the transmission signal due to the phase noise, the phase noise may impose some negative influence on demodulation of a received signal, e.g., on a calculation result of a Log-Likelihood Ratio (LLR), and may impose a larger negative influence thereon at a higher level of Modulation and Coding Scheme (MCS), and for example, the precision of calculating an LLR may be higher at a higher level of MCS, where there is a higher transmission rate of communication at a higher level of MCS.

In the prior art, the eNB generally demodulates the received signal in the following schemes.

In a first scheme, the eNB regards the received signal equivalently as a signal of a standard constellation point, onto which noise in a complex Gaussian distribution is superimposed, i.e., Gaussian white noise, and then calculates an LLR of the received signal.

However only the Gaussian white noise is taken into account, but the phase noise is not treated correspondingly in the first scheme, so the calculated LLR may not be precise.

In a second scheme, the phase noise is introduced to a constellation point of the transmission signal, and then the LLR of the received signal is calculated.

However when the phase noise is verified in the second scheme, the reception performance of a receiver may be degraded, and the demodulation efficiency may be lowered.

SUMMARY

Embodiments of the invention provide a method and apparatus for demodulating a signal, so as to address phase noise while a signal is being demodulated, to thereby improve the performance of receiving the signal by an eNB, and the efficiency and accuracy of demodulating the signal.

Specific technical solutions according to the embodiments of the invention are as follows.

An embodiment of the invention provides a method for demodulating a signal, the method including:

obtaining a received signal, wherein the received signal includes a phase noise signal;

creating a likelihood probability ratio integral model based upon the received signal and a preset phase noise parameter, wherein the phase noise parameter represents the phase noise signal, which is a random variable;

performing phase rotation angle extraction conversion process, and discretization process on the likelihood probability ratio integral model to obtain a likelihood probability ratio discretization model, wherein the phase rotation angle represents a phase rotation angle obtained based upon the phase noise signal; and determining likelihood probability ratios corresponding to the received signal based upon the likelihood probability ratio discretization model, and obtaining a demodulation result.

In one embodiment creating the likelihood probability ratio integral model based upon the received signal and the preset phase noise parameter includes:

obtaining each bit in the received signal and a sequence number corresponding to the each bit;

determining a first set of constellation points and a second set of constellation points corresponding to the each bit respectively based upon a preset association relationship between bits, sequence numbers of the bits, and constellation points, wherein the first set of constellation points corresponding to one bit is a corresponding set of constellation points when the bit is 0, and the second set of constellation points corresponding to one bit is a corresponding set of constellation points when the bit is 1;

creating a first likelihood probability model corresponding to the each bit based upon the corresponding first set of constellation points and the phase noise parameter, and creating a second likelihood probability model corresponding to the each bit based upon the corresponding second set of constellation points and the phase noise parameter, wherein the first likelihood probability model corresponding to one bit represents a corresponding likelihood probability when the bit is 0, and the second likelihood probability model corresponding to one bit represents a corresponding likelihood probability when the bit is 1; and creating the likelihood probability ratio integral model corresponding to the each bit based upon a logarithm of a ratio of the first likelihood probability model to the second likelihood probability model corresponding to the each bit.

In one embodiment creating the first likelihood probability model corresponding to the each bit based upon the corresponding first set of constellation points and the phase noise parameter includes:

determining the phase rotation angle based upon the phase noise parameter, wherein the phase rotation angle is positively correlated to a parameter being a complex index of e, the complex index being the phase noise parameter;

creating a constellation point probability model corresponding to each constellation point based upon a product of each constellation point and the phase rotation angle; and creating the first likelihood probability model corresponding to the each bit based upon the constellation point probability models corresponding to the respective constellation points in the corresponding first set of constellation points, wherein the first likelihood probability model corresponding to one bit is positively correlated to a sum of the constellation point probability models corresponding to the respective constellation points in the first set of constellation points corresponding to the bit.

In one embodiment creating the second likelihood probability model corresponding to the each bit based upon the corresponding second set of constellation points and the phase noise parameter includes:

determining the phase rotation angle based upon the phase noise parameter, wherein the phase rotation angle is positively correlated to a parameter being a complex index of e, the complex index being the phase noise parameter;

creating a constellation point probability model corresponding to the each constellation point based upon a product of the each constellation point and the phase rotation angle; and creating the second likelihood probability model corresponding to the each bit based upon the constellation point probability models corresponding to the respective constellation points in the corresponding second set of constellation points, wherein the second likelihood probability model corresponding to one bit is positively correlated to a sum of the constellation point probability models corresponding to the respective constellation points in the second set of constellation points corresponding to the bit.

In one embodiment performing phase rotation angle extraction conversion process, and discretization process on the likelihood probability ratio integral model to obtain the likelihood probability ratio discretization model includes:

multiplying the numerator and the denominator of the likelihood probability ratio integral model respectively with a preset extraction conversion parameter, and obtaining a likelihood probability ratio phase compensation model, wherein the extraction conversion parameter is positively correlated to a parameter being a complex index of e, the complex index being a negative of the phase noise parameter, and the likelihood probability ratio phase compensation model represents phase compensation on the received signal for phase rotation; and performing discrete summation on the likelihood probability ratio phase compensation model, and performing approximation process based on a max-log-map algorithm to obtain the likelihood probability ratio discretization model, wherein the likelihood probability ratio discretization model is positively correlated to the difference between a first Euclidean distance and a second Euclidean distance, the first Euclidean distance represents the shortest Euclidean distance from respective constellation points in a corresponding first set of constellation points when a bit is 0, and the second Euclidean distance represents the shortest Euclidean distance from respective constellation points in a corresponding second set of constellation points when the bit is 1.

In one embodiment determining the likelihood probability ratios corresponding to the received signal based upon the likelihood probability ratio discretization model and obtaining the demodulation result includes:

determining the first Euclidean distance and the second Euclidean distance corresponding to each bit in the received signal respectively based upon the likelihood probability ratio discretization model;

determining the likelihood probability ratio corresponding to the each bit respectively based upon the first Euclidean distance and the second Euclidean distance corresponding to the each bit in the received signal, wherein the likelihood probability ratio corresponding to one bit is positively correlated to the difference between the first Euclidean distance and the second Euclidean distance corresponding to the bit; and determining the demodulation result of the received signal based upon the likelihood probability ratio corresponding to the each bit in the received signal.

An embodiment of the invention provides an apparatus for demodulating a signal, the apparatus including:

an obtaining unit configured to obtain a received signal, wherein the received signal includes a phase noise signal;

a creating unit configured to create a likelihood probability ratio integral model based upon the received signal and a preset phase noise parameter, wherein the phase noise parameter represents the phase noise signal, and is a random variable;

a discretizing unit configured to perform phase rotation angle extraction conversion process, and discretization process on the likelihood probability ratio integral model to obtain a likelihood probability ratio discretization model, wherein the phase rotation angle represents a phase rotation angle obtained based upon the phase noise signal; and a determining unit configured to determine likelihood probability ratios corresponding to the received signal based upon the likelihood probability ratio discretization model and obtain a demodulation result.

In one embodiment the creating unit configured to create the likelihood probability ratio integral model based upon the received signal and the preset phase noise parameter is configured:

to obtain each bit in the received signal and a sequence number corresponding to the each bit;

to determine a first set of constellation points and a second set of constellation points corresponding to the each bit respectively based upon a preset association relationship between bits, sequence numbers of the bits, and constellation points, wherein the first set of constellation points corresponding to one bit is a corresponding set of constellation points when the bit is 0, and the second set of constellation points corresponding to one bit is a corresponding set of constellation points when the bit is 1;

to create a first likelihood probability model corresponding to the each bit based upon the corresponding first set of constellation points and the phase noise parameter, and to create a second likelihood probability model corresponding to the each bit based upon the corresponding second set of constellation points and the phase noise parameter, wherein the first likelihood probability model corresponding to one bit represents a corresponding likelihood probability when the bit is 0, and the second likelihood probability model corresponding to one bit represents a corresponding likelihood probability when the bit is 1; and to create the likelihood probability ratio integral model corresponding to the each bit based upon a logarithm of a ratio of the first likelihood probability model to the second likelihood probability model corresponding to the each bit.

In one embodiment the creating unit configured to create the first likelihood probability model corresponding to the each bit based upon the corresponding first set of constellation points and the phase noise parameter is configured:

to determine the phase rotation angle based upon the phase noise parameter, wherein the phase rotation angle is positively correlated to a parameter being a complex index of e, the complex index being the phase noise parameter;

to create a constellation point probability model corresponding to each constellation point based upon a product of each constellation point and the phase rotation angle; and to create the first likelihood probability model corresponding to the each bit based upon the constellation point probability models corresponding to the respective constellation points in the corresponding first set of constellation points, wherein the first likelihood probability model corresponding to one bit is positively correlated to a sum of the constellation point probability models corresponding to the respective constellation points in the first set of constellation points corresponding to the bit.

In one embodiment the creating unit configured to create the second likelihood probability model corresponding to the each bit based upon the corresponding second set of constellation points and the phase noise parameter is configured:

to determine the phase rotation angle based upon the phase noise parameter, wherein the phase rotation angle is positively correlated to a parameter being a complex index of e, the complex index being the phase noise parameter;

to create a constellation point probability model corresponding to each constellation point based upon a product of each constellation point and the phase rotation angle; and to create the second likelihood probability model corresponding to the each bit based upon the constellation point probability models corresponding to the respective constellation points in the corresponding second set of constellation points, wherein the second likelihood probability model corresponding to one bit is positively correlated to a sum of the constellation point probability models corresponding to the respective constellation points in the second set of constellation points corresponding to the bit.

In one embodiment the discretizing unit configured to perform phase rotation angle extraction conversion process, and discretization process on the likelihood probability ratio integral model to obtain the likelihood probability ratio discretization model is configured:

to multiply a numerator and a denominator of the likelihood probability ratio integral model respectively with a preset extraction conversion parameter, and to obtain a likelihood probability ratio phase compensation model, wherein the extraction conversion parameter is positively correlated to a parameter being a complex index of e, the complex index being a negative of the phase noise parameter, and the likelihood probability ratio phase compensation model represents phase compensation on the received signal for phase rotation; and to perform discrete summation on the likelihood probability ratio phase compensation model, and to perform approximation process based on a max-log-map algorithm to obtain the likelihood probability ratio discretization model, wherein the likelihood probability ratio discretization model is positively correlated to a difference between a first Euclidean distance and a second Euclidean distance, the first Euclidean distance represents the shortest Euclidean distance from respective constellation points in a corresponding first set of constellation points when a bit is 0, and the second Euclidean distance represents the shortest Euclidean distance from respective constellation points in a corresponding second set of constellation points when the bit is 1.

In one embodiment the determining unit configured to determine the likelihood probability ratios corresponding to the received signal based upon the likelihood probability ratio discretization model to obtain the demodulation result is configured: to determine the first Euclidean distance and the second Euclidean distance corresponding to each bit in the received signal respectively based upon the likelihood probability ratio discretization model; to determine the likelihood probability ratio corresponding to each bit based upon the first Euclidean distance and the second Euclidean distance corresponding to each bit in the received signal, wherein the likelihood probability ratio corresponding to one bit is positively correlated to the difference between the first Euclidean distance and the second Euclidean distance corresponding to the bit; and to determine the demodulation result of the received signal based upon the likelihood probability ratio corresponding to each bit in the received signal.

In the embodiments of the invention, a received signal is obtained, where the received signal includes a phase noise signal; a likelihood probability ratio integral model is created based upon the received signal and a preset phase noise parameter, where the phase noise parameter represents the phase noise signal, and is a random variable; phase rotation angle extraction conversion process, and discretization process are performed on the likelihood probability ratio integral model to obtain a likelihood probability ratio discretization model, where the phase rotation angle represents a phase rotation angle obtained based upon the phase noise signal; and likelihood probability ratios corresponding to the received signal are determined based upon the likelihood probability ratio discretization model and a demodulation result is obtained. In this way, the likelihood probability ratio integral model corresponding to the received signal is created, phase compensation and discretization is performed on the received signal based upon the likelihood probability ratio integral model, the likelihood probability ratios corresponding to the received signal are determined, and the demodulation result is obtained, thus addressing the phase noise, improving the performance of receiving the signal, and the efficiency and accuracy of demodulating the signal.

DETAILED DESCRIPTION

Figure 1:
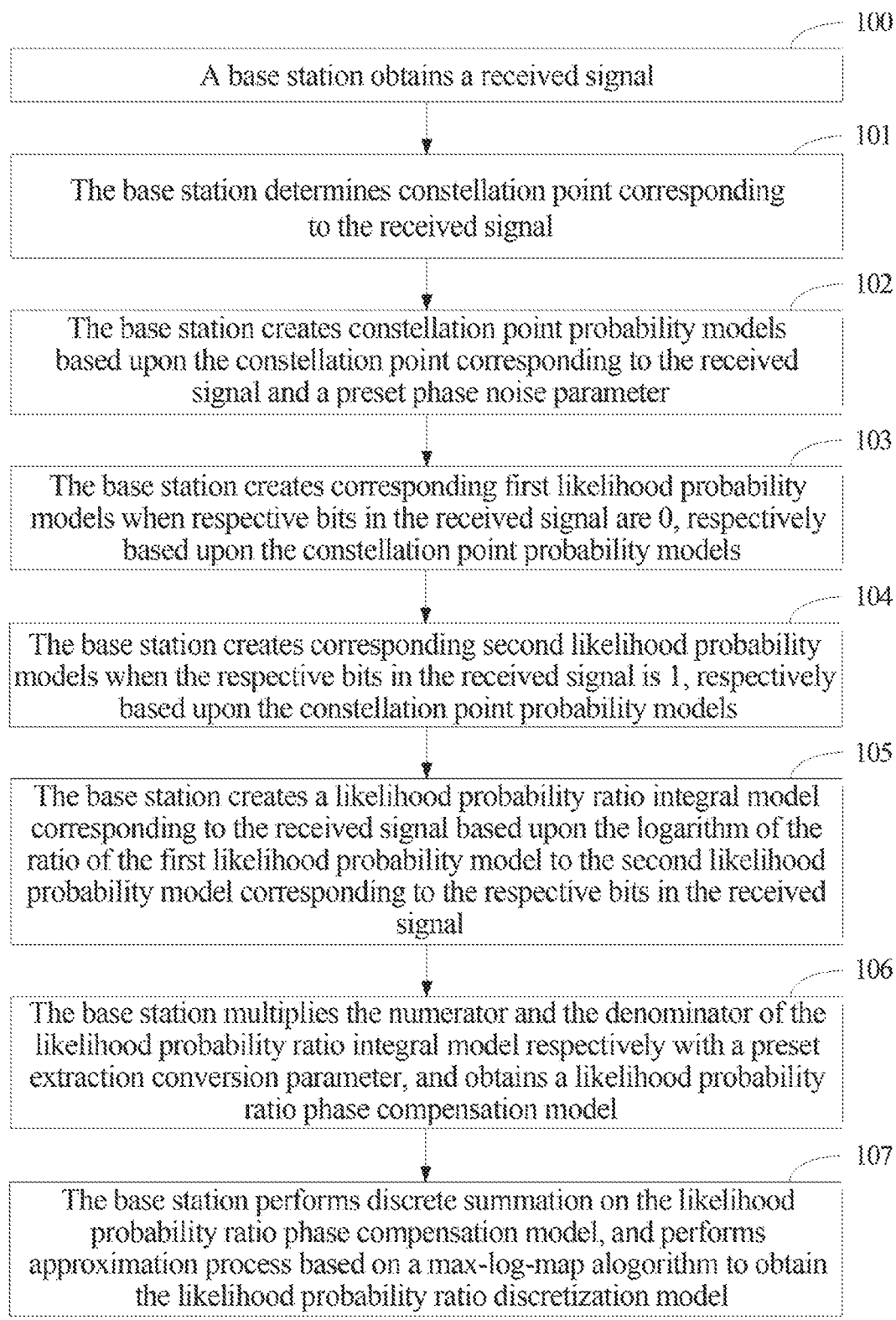
FIG. 1 is a flow chart of a method for demodulating a signal according to an embodiment of the invention.

In order to make the objects, technical solutions, and advantages of the embodiments of the invention more apparent, the technical solutions according to the embodiments of the invention will be described below clearly and fully with reference to the drawings in the embodiments of the invention. Apparently the embodiments to be described are only a part but not all of the embodiments of the invention. Based upon the embodiments here of the invention, all of other embodiments which can occur to those ordinarily skilled in the art without any inventive effort shall come into the scope of the invention as claimed.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a Long Term Evolution-Advanced (LTE-A) system, a Universal Mobile Telecommunication System (UMTS), etc.

It shall be further appreciated that in the embodiments of the invention, a User Equipment (UE) includes but will not be limited to a Mobile Station (MS), a mobile terminal, a mobile telephone, a handset, a portable equipment, etc., and the user equipment can communicate with one or more core networks over a Radio Access Network (RAN). For example, the user equipment can be a mobile phone (referred to as a "cellular" phone), a computer with a function of radio communication, etc., and the user equipment can also be a portable, pocket, handheld, built-in-computer, or on-vehicle mobile device.

In the embodiments of the invention, a base station (e.g., an access point) can be such a device in an access network that communicates with a radio terminal over one or more sectors via an air interface. The base station can be configured to convert a received air frame into an IP packet, and a received IP packet into an air frame, and operate as a router between the radio terminal, and the remaining components of the access network, where the remaining components of the access network can include an Internet Protocol (IP) network. The base station can further coordinate attribute management on the air interface, and for example, the base station can be a Base Communication module Station (BTS) in a GSM or CDMA system, or can be a base station (Node B) in a WCDMA system, or can be an evolved base station (Node B or eNB or e-Node B) in an LTE system, although the invention will not be limited thereto.

The technical solutions according to the embodiments of the invention will be described below clearly and fully with reference to the drawings in the embodiments of the invention. Apparently the embodiments to be described are only a part but all of the embodiments of the invention. Based upon the embodiments here of the invention, all of other embodiments which can occur to those ordinarily skilled in the art without any inventive effort shall come into the scope of the invention as claimed.

In order to overcome phase noise while a base station is demodulating a signal, to thereby improve the performance of receiving the signal, and the efficiency and accuracy of demodulating the signal, there is designed in an embodiment of the invention a method for demodulating a signal, where the method includes: creating a likelihood probability ratio integral model corresponding to a received signal, performing phase compensation and discretization process on the received signal based upon the likelihood probability ratio integral model, determining likelihood probability ratio(s) corresponding to the received signal, and obtaining a demodulation result.

An embodiment of the invention will be described below in details with reference to the drawings.

As illustrated in FIG. 1, a specific flow of demodulating a signal according to an embodiment of the invention is as follows.

In the step 100, a base station obtains a received signal.

In a real application, the base station obtains the received signal transmitted by a transmitting device, and optionally the transmitting device can be a base station, a commercial terminal, or a test terminal.

Phase noise independent of Gaussian noise may occur while the received signal transmitted by the terminal or the base station is being processed, and phase noise may also occur while the received signal is being obtained by the base station, so the received signal further includes the phase noise and the Gaussian noise.

In the step 101, the base station determines constellation points corresponding to the received signal.

In a real application, the base station obtains a preset association relationship between bits, sequences numbers of the bits, and constellation points based upon a modulation scheme of the received signal. Optionally the modulation scheme can be 4-Quadrature Amplitude Modulation (QAM), 16QAM, or 64QAM.

The base station obtains respective bits in the received signal, and determines a first set of constellation points and a second set of constellation points corresponding to each bit according to the preset association relationship between bits, sequence numbers of the bits, and constellation points, where the first set of constellation points corresponding to one bit is a corresponding set of constellation points when the bit is 0, and the second set of constellation points corresponding to one bit is a corresponding set of constellation points when the bit is 1.

Figure 2:
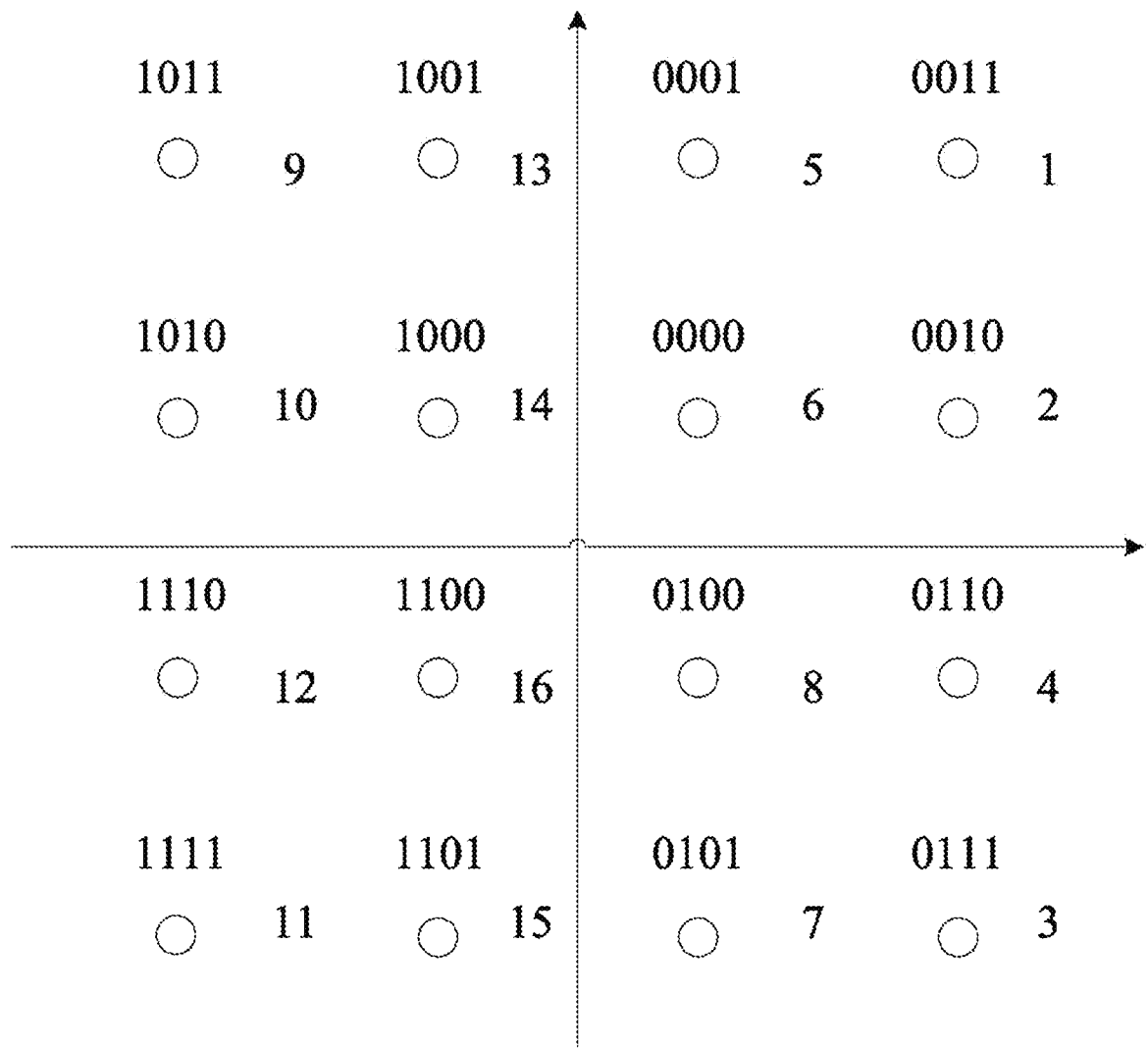
FIG. 2 is a schematic diagram of a constellation chart of signal demodulation according to an embodiment of the invention.

For example, FIG. 2 illustrates constellation point chart corresponding to 16QAM, every four bits are mapped to a constellation point chart, and given that sequence numbers of the four bits are a, b, c, and d. When the bit a is 0, the base station determines a first set of constellation points corresponding to the bit a as {1, 2, 3, 4, 5, 6, 7, 8}; and when the bit a is 1, the base station determines a first set of constellation points corresponding to the bit a as {9, 10, 11, 12, 13, 14, 15, 16}.

In the step 102, the base station creates constellation point probability models based upon the constellation points corresponding to the received signal and a preset phase noise parameter.

In a real application, the base station determines a phase rotation angle of the received signal based upon the preset phase noise parameter, where the phase rotation angle is positively correlated to a parameter being a complex index of e, where the complex index being the phase noise parameter, i.e., complex index of e being $e^{j\theta}$.

Then the base station creates a received signal model based upon the product of the constellation point and the phase rotation angle.

Optionally the received signal model can be represented in the equation of:

$$y = xe^{j\theta} + n.$$

Where y is the received signal, x is a constellation point, θ is phase noise, which is a random variable obeying a uniform distribution (−a, a), a ∈ (−∞, ∞), n is Gaussian noise, and $e^{j\theta}$ is the phase rotation angle.

Furthermore the base station creates the constellation point probability model corresponding to the each constellation point based upon the received signal model.

Optionally each constellation point probability model can be represented in the equation of:

$$p(y \mid x = x_k, \theta) = \frac{1}{\pi\sigma^2} e^{-\frac{|y - x_k e^{j\theta}|^2}{\sigma^2}}.$$

Where $p(y|x=x_k, \theta)$ is a constellation point probability model corresponding to a constellation point $x_k$, $x_k$ is a constellation point, k is a natural number, $\theta$ is phase noise, which is a random variable obeying a uniform distribution $(-a, a)$, $a \in (-\infty, \infty)$, $\sigma$ is a standard deviation, and $\pi$ is the circumference ratio.

In the step 103, the base station creates first likelihood probability models when respective bits in the received signal are 0 respectively based upon the constellation point probability models.

In a real application, the base station creates the corresponding first likelihood probability model corresponding each bit when each bit in the received signal is 0 based upon the first set of constellation points corresponding to each bit in the received signal and the corresponding constellation point probability model, where the first likelihood probability model corresponding to one bit represents a corresponding likelihood probability when the bit is 0, and the first likelihood probability model corresponding to the bit is positively correlated to the sum of the constellation point probability models corresponding to the respective constellation points in the first set of constellation points corresponding to the bit.

Optionally each first likelihood probability model can be represented in the equation of:

$$p(y \mid b_m = 0) = \sum_{x_i \in x_{m,0}} p(y \mid x = x_i) = \sum_{x_i \in x_{m,0}} \frac{1}{2a} \int_{-a}^{a} p(y \mid x = x_i, \theta) d\theta.$$

Where $p(y|b_m=0)$ is a first likelihood probability, $x_i$ is a constellation point, $x_i \in X_m$, $X_{m,0}$ represents a corresponding first set of constellation points when bm is 0, i and m are natural noise, $\theta$ is phase noise, which is a random variable obeying a uniform distribution $(-a, a)$, and $a \in (-\infty, \infty)$.

In the step 104, the base station creates corresponding second likelihood probability models when the respective bits in the received signal is 1, respectively based upon the constellation point probability models.

In a real application, the base station creates the corresponding second likelihood probability model corresponding to each bit when each bit in the received signal is 1, based upon the second set of constellation points corresponding to the each bit in the received signal, and their constellation point probability models, where the second likelihood probability model corresponding to a bit represents a corresponding likelihood probability when the bit is 1, and the second likelihood probability model corresponding to the bit is positively correlated to the sum of the constellation point probability models corresponding to the respective constellation points in the second set of constellation points corresponding to the bit.

Optionally each second likelihood probability model can be represented in the equation of:

$$p(y \mid b_m = 1) = \sum_{x_r \in x_{m,0}} p(y \mid x = x_r) = \sum_{x_r \in x_{m,0}} \frac{1}{2a} \int_{-a}^{a} p(y \mid x = x_r, \theta) d\theta.$$

Where $p(y|b_m=1)$ is a second likelihood probability, $x_r$ is a constellation point, $x_r \in x_m$, $X_{m,1}$ represents a corresponding second set of constellation points when bm is 1, i and m are natural noise, $\theta$ is phase noise, which is a random variable obeying a uniform distribution $(-a, a)$, and $a \in (-\infty, \infty)$.

In the step 105, the base station creates a likelihood probability ratio integral model corresponding to the received signal based upon the logarithms of the ratios of the first likelihood probability models to the second likelihood probability models corresponding to the respective bits in the received signal.

In a real application, the likelihood probability ratio integral model can be represented in the step 105 in the equation of:

$$p = \ln\frac{p(y \mid b_m = 0)}{p(y \mid b_m = 1)} = \ln\frac{\sum_{x_i \in x_{m,0}} \frac{1}{2a} \int_{-a}^{a} p(y \mid x = x_i, \theta) d\theta}{\sum_{x_r \in x_{m,0}} \frac{1}{2a} \int_{-a}^{a} p(y \mid x = x_r, \theta) d\theta}.$$

Where p is a likelihood probability ratio, p $(y|b_m=0)$ is a first likelihood probability, $p(y|b_m=1)$ is a second likelihood probability, $x_i$ is a constellation point, $X_{m,0}$ represents a corresponding first set of constellation points when a bit $b_m$ is 0, $x_r$ is a constellation point, $X_{m,1}$ represents a corresponding second set of constellation points when the bit $b_m$ is 1, m, i, and r are natural numbers, $\theta$ is phase noise, which is a random variable obeying a uniform distribution $(-a, a)$, and $a \in (-\infty, \infty)$.

In the step 106, the base station multiplies the numerator and the denominator of the likelihood probability ratio integral model respectively by a preset extraction conversion parameter to obtain a likelihood probability ratio phase compensation model.

In a real application, in the step 106, the extraction conversion parameter is positively correlated to a parameter being a complex index of e, the complex index being a negative of the phase noise parameter, and the likelihood probability ratio phase compensation model represents phase compensation on the received signal for phase rotation.

Optionally the likelihood probability ratio phase compensation model can be represented in the step 105 in the equation of:

$$p = \ln\frac{p(y \mid b_m = 0)e^{-2j\theta}}{p(y \mid b_m = 1)e^{-2j\theta}} = \ln\frac{\sum_{x_i \in x_{m,0}} \frac{1}{2a} \int_{-a}^{a} p(y \mid x = x_i, \theta) d\theta e^{-2j\theta}}{\sum_{x_r \in x_{m,1}} \frac{1}{2a} \int_{-a}^{a} p(y \mid x = x_r, \theta) d\theta e^{-2j\theta}} =$$

$$\frac{1}{\sigma^2}\left(\sum_{x_i \in x_{m,0}} \int_{-a}^{a} |ye^{-j\theta} - x_i|^2 d\theta - \sum_{x_r \in x_{m,1}} \int_{-a}^{a} |ye^{-j\theta} - x_r|^2 d\theta\right).$$

Where p is a likelihood probability ratio, $e^{-2j\theta}$ is a extraction conversion parameter, p $(y|b_m=0)$ is a first likelihood probability, p $(y|b_m=1)$ is a second likelihood probability, $x_i$ is a constellation point, $X_{m,0}$ represents a corresponding first set of constellation points when a bit $b_m$ is 0, $x_r$ is a constellation point, $X_{m,1}$ represents a corresponding second set of constellation points when the bit $b_m$ is 1, m, i, and r are natural numbers, θ is phase noise, which is a random variable obeying a uniform distribution (−a, a), and a ∈(−∞, ∞).

In the step 107, the base station performs discrete summation on the likelihood probability ratio phase compensation model, and performs approximation process based on a max-log-map algorithm to obtain the likelihood probability ratio discretization model.

In a real application, the base station performs discrete summation on the likelihood probability ratio phase compensation model, and performs approximation process based on the max-log-map algorithm to obtain the likelihood probability ratio discretization model, where the likelihood probability ratio discretization model is positively correlated to the difference between a first Euclidean distance and a second Euclidean distance, the first Euclidean distance represents the shortest Euclidean distance from respective constellation points in a corresponding first set of constellation points when a bit is 0, and the second Euclidean distance represents the shortest Euclidean distance from respective constellation points in a corresponding second set of constellation points when the bit is 1.

Optionally the first Euclidean distance can be represented in the equation of:

$$s_1 = \min_{x_i \in X_{m,0}, 0 \le t \le T} \left| y e^{-j(-a + \frac{2at}{T})} - x_i \right|^2.$$

Where $s_1$ is a first Euclidean distance; optionally T can be 16, and a can be $$\frac{\pi}{24};$$

$x_i$ is a constellation point; $X_{m,0}$ is a corresponding first set of constellation points when a bit $b_m$ is 0; and i is a natural number.

Optionally the second Euclidean distance can be represented in the equation of:

$$s_1 = \min_{x_r \in X_{m,1}, 0 \le t \le T} \left| y e^{-j(-a + \frac{2at}{T})} - x_r \right|^2.$$

Where $s_2$ is a second Euclidean distance; optionally T can be 16, and a can be $$\frac{\pi}{24};$$

$x_r$ is a constellation point; $X_{m,1}$ is a corresponding second set of constellation points when the bit $b_m$ is 1; and r is a natural number.

Optionally the likelihood probability ratio discretization model can be represented in the equation of:

$$p = \frac{1}{\sigma^2}(s_1 - s_2).$$

Where p is a likelihood probability ratio, $s_1$ is a first Euclidean distance, and $s_2$ is a second Euclidean distance.

In this way, based upon the likelihood probability ratio discretization model, firstly a first Euclidean distance and a second Euclidean distance corresponding to each bit in the received signal are determined respectively, and then the difference between the first Euclidean distance and the second Euclidean distance corresponding to each bit is calculated; and furthermore a likelihood probability ratio corresponding to each bit is determined according to the difference corresponding to each bit, thus resulting in a demodulation result of the received signal.

Furthermore since the first Euclidean distance represents the shortest Euclidean distance from respective constellation points in a corresponding first set of constellation points when a bit is 0, and the second Euclidean distance represents the shortest Euclidean distance from respective constellation points in a corresponding second set of constellation points when the bit is 1, the likelihood probability ratio corresponding to each bit can be further determined directly according to constellation chart corresponding to QAM to thereby obtain the demodulation result of the received signal.

Optionally as illustrated in FIG. 2, when the modulation scheme of the received signal is 16QAM, then every four bits are mapped to a constellation point chart. For example, a phase-compensated constellation point is (x, y).

Optionally the bit bm=0, the Euclidean distance from each constellation point in the corresponding first set of constellation points can be represented in the equation of:

$$s(m,0) = (D - |x_d - 2D|)^2 + (D - |y_e - 2D|)^2.$$

Where s(m, 0) is an Euclidean distance, optionally D can be $1/\sqrt{10}$, $(x_d, y_e)$ is coordinates of each constellation point in the first set of constellation points corresponding to bm, and m is a natural number.

Accordingly the first Euclidean distance $s_1$ is the smallest one of the Euclidean distances s(m, 0) corresponding to the respective constellation points in the first set of constellation points.

Optionally the bit bm=1, the Euclidean distance from each constellation point in the corresponding second set of constellation points can be represented in the equation of:

$$s(m,1) = (x_u + D)^2 + (D - |y_w - 2D|)^2.$$

Where s(m, 1) is an Euclidean distance, and optionally D can be $1/\sqrt{10}$, $(x_u, y_w)$ is coordinates of each constellation point in the second set of constellation points corresponding to bm.

Accordingly the second Euclidean distance $s_2$ is the smallest one of the Euclidean distances s(m, 1) corresponding to the respective constellation points in the second set of constellation points.

In this way, the base station can firstly determine the first sets of constellation points and the second sets of constellation points corresponding to the respective bits in the received signal. Then the base station obtains the first Euclidean distance by calculating the shortest Euclidean distance corresponding to each bit from the respective constellation points in the corresponding first set of constellation points, and obtains the second Euclidean distance by calculating the shortest Euclidean distance corresponding to each bit from the respective constellation points in the corresponding second set of constellation points. Furthermore the base station determines the demodulation result of the received signal according to the difference between the first Euclidean distance and the second Euclidean distance corresponding to each bit.

Figure 3:
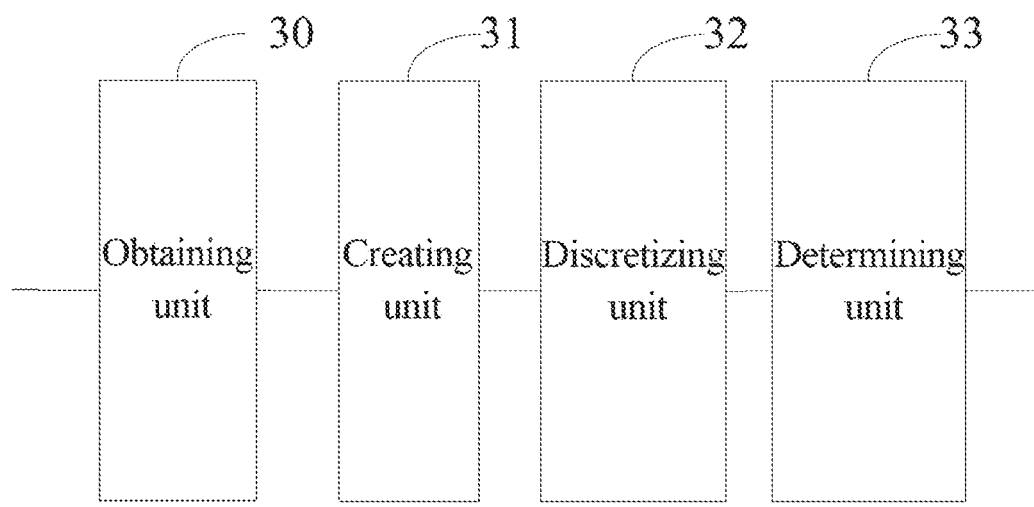
FIG. 3 is a schematic structural diagram of an apparatus for demodulating a signal according to an embodiment of the invention.

Based upon the embodiment above, as illustrated in FIG. 3 illustrating a schematic structural diagram of an apparatus for demodulating a signal, an apparatus for demodulating a signal according to an embodiment of the invention particularly includes the followings.

An obtaining unit 30 is configured to obtain a received signal, where the received signal includes a phase noise signal.

A creating unit 31 is configured to create a likelihood probability ratio integral model based upon the received signal and a preset phase noise parameter, where the phase noise parameter represents the phase noise signal, and is a random variable.

A discretizing unit 32 is configured to perform phase rotation angle extraction conversion process, and discretization process on the likelihood probability ratio integral model to obtain a likelihood probability ratio discretization model, where the phase rotation angle represents a phase rotation angle obtained based upon the phase noise signal.

A determining unit 33 is configured to determine likelihood probability ratios corresponding to the received signal based upon the likelihood probability ratio discretization model to obtain a demodulation result.

In one embodiment the creating unit 31 configured to create the likelihood probability ratio integral model based upon the received signal and the preset phase noise parameter is configured: to obtain each bit in the received signal and a sequence number corresponding to the each bit; to determine a first set of constellation points and a second set of constellation points corresponding to the each bit respectively based upon a preset association relationship between bits, sequence numbers of the bits, and constellation points, where the first set of constellation points corresponding to one bit is a corresponding set of constellation points when the bit is 0, and the second set of constellation points corresponding to one bit is a corresponding set of constellation points when the bit is 1; to create a first likelihood probability model corresponding to the each bit based upon the corresponding first set of constellation points and the phase noise parameter, and to create a second likelihood probability model corresponding to the each bit based upon the corresponding second set of constellation points and the phase noise parameter, where the first likelihood probability model corresponding to one bit represents a corresponding likelihood probability when the bit is 0, and the first likelihood probability model corresponding to the bit is positively correlated to a sum of the constellation point probability models corresponding to the respective constellation points in the first set of constellation points corresponding to the bit; and to create the likelihood probability ratio integral model corresponding to the each bit based upon a logarithm of a ratio of the first likelihood probability model to the second likelihood probability model corresponding to the each bit.

In one embodiment the creating unit 31 configured to create the first likelihood probability model corresponding to the each bit based upon the corresponding first set of constellation points and the phase noise parameter is configured: to determine the phase rotation angle based upon the phase noise parameter, where the phase rotation angle is positively correlated to a parameter being a complex index of e, the complex index being the phase noise parameter; to create a constellation point probability model corresponding to each constellation point based upon a product of each constellation point and the phase rotation angle; and to create the first likelihood probability model corresponding to each bit based upon the constellation point probability models corresponding to the respective constellation points in the corresponding first set of constellation points, where the first likelihood probability model corresponding to one bit is positively correlated to a sum of the constellation point probability models corresponding to the respective constellation points in the first set of constellation points corresponding to the bit.

In one embodiment the creating unit 31 configured to create the second likelihood probability model corresponding to the each bit based upon the corresponding second set of constellation points and the phase noise parameter is configured: to determine the phase rotation angle based upon the phase noise parameter, where the phase rotation angle is positively correlated to a parameter being a complex index of e, the complex index being the phase noise parameter; to a create constellation point probability model corresponding to each constellation point based upon a product of each constellation point and the phase rotation angle; and to create the second likelihood probability model corresponding to the each bit based upon the constellation point probability models corresponding to the respective constellation points in the corresponding second set of constellation points, where the second likelihood probability model corresponding to one bit is positively correlated to a sum of the constellation point probability models corresponding to the respective constellation points in the second set of constellation points corresponding to the bit.

In one embodiment the discretizing unit configured to perform phase rotation angle extraction conversion process, and discretization process on the likelihood probability ratio integral model to obtain the likelihood probability ratio discretization model is configured: to multiply the numerator and the denominator of the likelihood probability ratio integral model respectively with a preset extraction conversion parameter, and to obtain a likelihood probability ratio phase compensation model, where the extraction conversion parameter is positively correlated to a parameter being a complex index of e, the complex index being a negative of the phase noise parameter, and the likelihood probability ratio phase compensation model represents phase compensation on the received signal for phase rotation; and to perform discrete summation on the likelihood probability ratio phase compensation model, and to perform approximation process based on a max-log-map algorithm to obtain the likelihood probability ratio discretization model, where the likelihood probability ratio discretization model is positively correlated to the difference between a first Euclidean distance and a second Euclidean distance, the first Euclidean distance represents the shortest Euclidean distance from respective constellation points in a corresponding first set of constellation points when a bit is 0, and the second Euclidean distance represents the shortest Euclidean distance from respective constellation points in a corresponding second set of constellation points when the bit is 1.

In one embodiment the determining unit 33 configured to determine the likelihood probability ratios corresponding to the received signal based upon the likelihood probability ratio discretization model and obtain the demodulation result is configured: to determine the first Euclidean distance and the second Euclidean distance corresponding to each bit in the received signal respectively based upon the likelihood probability ratio discretization model; to determine the likelihood probability ratio corresponding to each bit respectively based upon the first Euclidean distance and the second Euclidean distance corresponding to each bit in the received signal, where the likelihood probability ratio corresponding to one bit is positively correlated to the difference between the first Euclidean distance and the second Euclidean distance corresponding to the bit; and to determine the demodulation result of the received signal based upon the likelihood probability ratio corresponding to each bit in the received signal.

In the embodiments of the invention, a received signal is obtained, where the received signal includes a phase noise signal; a likelihood probability ratio integral model is created based upon the received signal and a preset phase noise parameter, where the phase noise parameter represents the phase noise signal, and is a random variable; phase rotation angle extraction conversion process, and discretization process are performed on the likelihood probability ratio integral model to obtain a likelihood probability ratio discretization model, where the phase rotation angle represents a phase rotation angle obtained based upon the phase noise signal; and likelihood probability ratios corresponding to the received signal are determined based upon the likelihood probability ratio discretization model and a demodulation result is obtained. In this way, the likelihood probability ratio integral model corresponding to the received signal is created, phase compensation and discretization is performed on the received signal based upon the likelihood probability ratio integral model, the likelihood probability ratios corresponding to the received signal are determined, and the demodulation result is obtained, thus addressing the phase noise, improving the performance of receiving the signal, and the efficiency and accuracy of demodulating the signal.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for demodulating a signal, comprising:
obtaining a received signal, wherein the received signal comprises a phase noise signal;
creating a likelihood probability ratio integral model based upon the received signal and a preset phase noise parameter, wherein the phase noise parameter represents the phase noise signal, and is a random variable;
performing phase rotation angle extraction conversion process, and discretization process on the likelihood probability ratio integral model to obtain a likelihood probability ratio discretization model, wherein the phase rotation angle represents a phase rotation angle obtained based upon the phase noise signal; and
determining likelihood probability ratios corresponding to the received signal based upon the likelihood probability ratio discretization model, and obtaining a demodulation result.

2. The method according to claim 1, wherein creating the likelihood probability ratio integral model based upon the received signal and the preset phase noise parameter comprises:
obtaining each bit in the received signal and a sequence number corresponding to the each bit;
determining a first set of constellation points and a second set of constellation points corresponding to the each bit respectively based upon a preset association relationship between bits, sequence numbers of the bits, and constellation points, wherein the first set of constellation points corresponding to one bit is a corresponding set of constellation points when the bit is 0, and the second set of constellation points corresponding to one bit is a corresponding set of constellation points when the bit is 1;
creating a first likelihood probability model corresponding to the each bit based upon the corresponding first set of constellation points and the phase noise parameter, and creating a second likelihood probability model corresponding to each bit based upon a corresponding second set of constellation points and the phase noise parameter, wherein the first likelihood probability model corresponding to one bit represents a corresponding likelihood probability when the bit is 0, and the second likelihood probability model corresponding to one bit represents a corresponding likelihood probability when the bit is 1; and
creating the likelihood probability ratio integral model corresponding to each bit based upon a logarithm of a ratio of the first likelihood probability model to the second likelihood probability model corresponding to each bit.

3. The method according to claim 2, wherein creating the first likelihood probability model corresponding to the each bit based upon the corresponding first set of constellation points and the phase noise parameter comprises:
determining the phase rotation angle based upon the phase noise parameter, wherein the phase rotation angle is positively correlated to a parameter being a complex index of e, the complex index being the phase noise parameter;
creating a constellation point probability model corresponding to each constellation point based upon a product of each constellation point and the phase rotation angle; and
creating the first likelihood probability model corresponding to the each bit based upon constellation point probability models corresponding to respective constellation points in the corresponding first set of constellation points, wherein the first likelihood probability model corresponding to one bit is positively correlated to a sum of the constellation point probability models corresponding to the respective constellation points in the first set of constellation points corresponding to the bit.

4. The method according to claim 2, wherein creating the second likelihood probability model corresponding to the each bit based upon the corresponding second set of constellation points and the phase noise parameter comprises:
determining the phase rotation angle based upon the phase noise parameter, wherein the phase rotation angle is positively correlated to a parameter being a complex index of e, the complex index being the phase noise parameter;
creating a constellation point probability model corresponding to each constellation point based upon a product of each constellation point and the phase rotation angle; and
creating the second likelihood probability model corresponding to each bit based upon constellation point probability models corresponding to the respective constellation points in the corresponding second set of constellation points, wherein the second likelihood probability model corresponding to one bit is positively correlated to a sum of the constellation point probability models corresponding to the respective constellation points in the second set of constellation points corresponding to the bit.

5. The method according to claim 2, wherein performing phase rotation angle extraction conversion process, and discretization process on the likelihood probability ratio integral model to obtain the likelihood probability ratio discretization model comprises:
multiplying a numerator and a denominator of the likelihood probability ratio integral model respectively with a preset extraction conversion parameter, and obtaining a likelihood probability ratio phase compensation model, wherein the extraction conversion parameter is positively correlated to a parameter being a complex index of e, the complex index being a negative of the phase noise parameter, and the likelihood probability ratio phase compensation model represents phase compensation on the received signal for phase rotation; and
performing discrete summation on the likelihood probability ratio phase compensation model, and performing approximation process based on a max-log-map algorithm to obtain the likelihood probability ratio discretization model, wherein the likelihood probability ratio discretization model is positively correlated to a difference between a first Euclidean distance and a second Euclidean distance, the first Euclidean distance represents a shortest Euclidean distance from respective constellation points in a corresponding first set of constellation points when a bit is 0, and the second Euclidean distance represents a shortest Euclidean distance from respective constellation points in a corresponding second set of constellation points when the bit is 1.

6. The method according to claim 5, wherein determining the likelihood probability ratios corresponding to the received signal based upon the likelihood probability ratio discretization model and obtaining the demodulation result comprises:
determining the first Euclidean distance and the second Euclidean distance corresponding to the each bit in the received signal respectively based upon the likelihood probability ratio discretization model;
determining the likelihood probability ratio corresponding to the each bit based upon the first Euclidean distance and the second Euclidean distance corresponding to the each bit in the received signal, wherein the likelihood probability ratio corresponding to one bit is positively correlated to the difference between the first Euclidean distance and the second Euclidean distance corresponding to the bit; and
determining the demodulation result of the received signal based upon the likelihood probability ratio corresponding to the each bit in the received signal.

7. An apparatus for demodulating a signal, comprising:
an obtaining unit configured to obtain a received signal, wherein the received signal comprises a phase noise signal;
a creating unit configured to create a likelihood probability ratio integral model based upon the received signal and a preset phase noise parameter, wherein the phase noise parameter represents the phase noise signal, and is a random variable;
a discretizing unit configured to perform phase rotation angle extraction conversion process, and discretization process on the likelihood probability ratio integral model to obtain a likelihood probability ratio discretization model, wherein the phase rotation angle represents a phase rotation angle obtained based upon the phase noise signal; and
a determining unit configured to determine likelihood probability ratios corresponding to the received signal based upon the likelihood probability ratio discretization model, and obtain a demodulation result.

8. The apparatus according to claim 7, wherein the creating unit configured to create the likelihood probability ratio integral model based upon the received signal and the preset phase noise parameter is configured:
to obtain each bit in the received signal and a sequence number corresponding to the each bit;
to determine a first set of constellation points and a second set of constellation points corresponding to the each bit respectively based upon a preset association relationship between bits, sequence numbers of the bits, and constellation points, wherein the first set of constellation points corresponding to one bit is a corresponding set of constellation points when the bit is 0, and the second set of constellation points corresponding to one bit is a corresponding set of constellation points when the bit is 1;

to create a first likelihood probability model corresponding to the each bit based upon the corresponding first set of constellation points and the phase noise parameter, and to create a second likelihood probability model corresponding to the each bit based upon the corresponding second set of constellation points and the phase noise parameter, wherein the first likelihood probability model corresponding to one bit represents a corresponding likelihood probability when the bit is 0, and the second likelihood probability model corresponding to one bit represents a corresponding likelihood probability when the bit is 1; and to create the likelihood probability ratio integral model corresponding to the each bit based upon a logarithm of a ratio of the first likelihood probability model to the second likelihood probability model corresponding to the each bit.

9. The apparatus according to claim 8, wherein the creating unit configured to create the first likelihood probability model corresponding to the each bit based upon the corresponding first set of constellation points and the phase noise parameter is configured:

to determine the phase rotation angle based upon the phase noise parameter, wherein the phase rotation angle is positively correlated to a parameter being a complex index of e, the complex index being the phase noise parameter;

to create a constellation point probability model corresponding to each constellation point based upon a product of each constellation point and the phase rotation angle; and to create the first likelihood probability model corresponding to the each bit based upon constellation point probability models corresponding to respective constellation points in the corresponding first set of constellation points, wherein the first likelihood probability model corresponding to one bit is positively correlated to a sum of the constellation point probability models corresponding to the respective constellation points in the first set of constellation points corresponding to the bit.

10. The apparatus according to claim 8, wherein the creating unit configured to create the second likelihood probability model corresponding to the each bit based upon the corresponding second set of constellation points and the phase noise parameter is configured:

to determine the phase rotation angle based upon the phase noise parameter, wherein the phase rotation angle is positively correlated to a parameter being a complex index of e, the complex index being the phase noise parameter;

to create a constellation point probability model corresponding to each constellation point based upon a product of each constellation point and the phase rotation angle; and to create the second likelihood probability model corresponding to each bit based upon the constellation point probability models corresponding to respective constellation points in the corresponding second set of constellation points, wherein the second likelihood probability model corresponding to one bit is positively correlated to a sum of the constellation point probability models corresponding to the respective constellation points in the second set of constellation points corresponding to the bit.

11. The apparatus according to claim 8, wherein the discretizing unit configured to perform phase rotation angle extraction conversion process, and discretization process on the likelihood probability ratio integral model to obtain the likelihood probability ratio discretization model is configured:

to multiply a numerator and a denominator of the likelihood probability ratio integral model respectively with a preset extraction conversion parameter, and to obtain a likelihood probability ratio phase compensation model, wherein the extraction conversion parameter is positively correlated to a parameter being a complex index of e, the complex index being a negative of the phase noise parameter, and the likelihood probability ratio phase compensation model represents phase compensation on the received signal for phase rotation; and to perform discrete summation on the likelihood probability ratio phase compensation model, and to perform approximation process based on a max-log-map algorithm to obtain the likelihood probability ratio discretization model, wherein the likelihood probability ratio discretization model is positively correlated to a difference between a first Euclidean distance and a second Euclidean distance, the first Euclidean distance represents a shortest Euclidean distance from respective constellation points in a corresponding first set of constellation points when a bit is 0, and the second Euclidean distance represents a shortest Euclidean distance from respective constellation points in a corresponding second set of constellation points when the bit is 1.

12. The apparatus according to claim 11, wherein the determining unit configured to determine the likelihood discretization ratios corresponding to the received signal based upon the likelihood discretization ratio discretization model and obtain the demodulation result is configured:

to determine the first Euclidean distance and the second Euclidean distance corresponding to the each bit in the received signal respectively based upon the likelihood probability ratio discretization model;

to determine the likelihood probability ratio corresponding to each bit based upon the first Euclidean distance and the second Euclidean distance corresponding to the each bit in the received signal, wherein the likelihood probability ratio corresponding to one bit is positively correlated to the difference between the first Euclidean distance and the second Euclidean distance corresponding to the bit; and to determine the demodulation result of the received signal based upon the likelihood probability ratio corresponding to the each bit in the received signal.

* * * * *